April 15, 1947.　　　I. WOLFF ET AL　　　2,419,046
FREQUENCY MODULATED ALTIMETER OR DISTANCE INDICATOR
Filed May 29, 1942
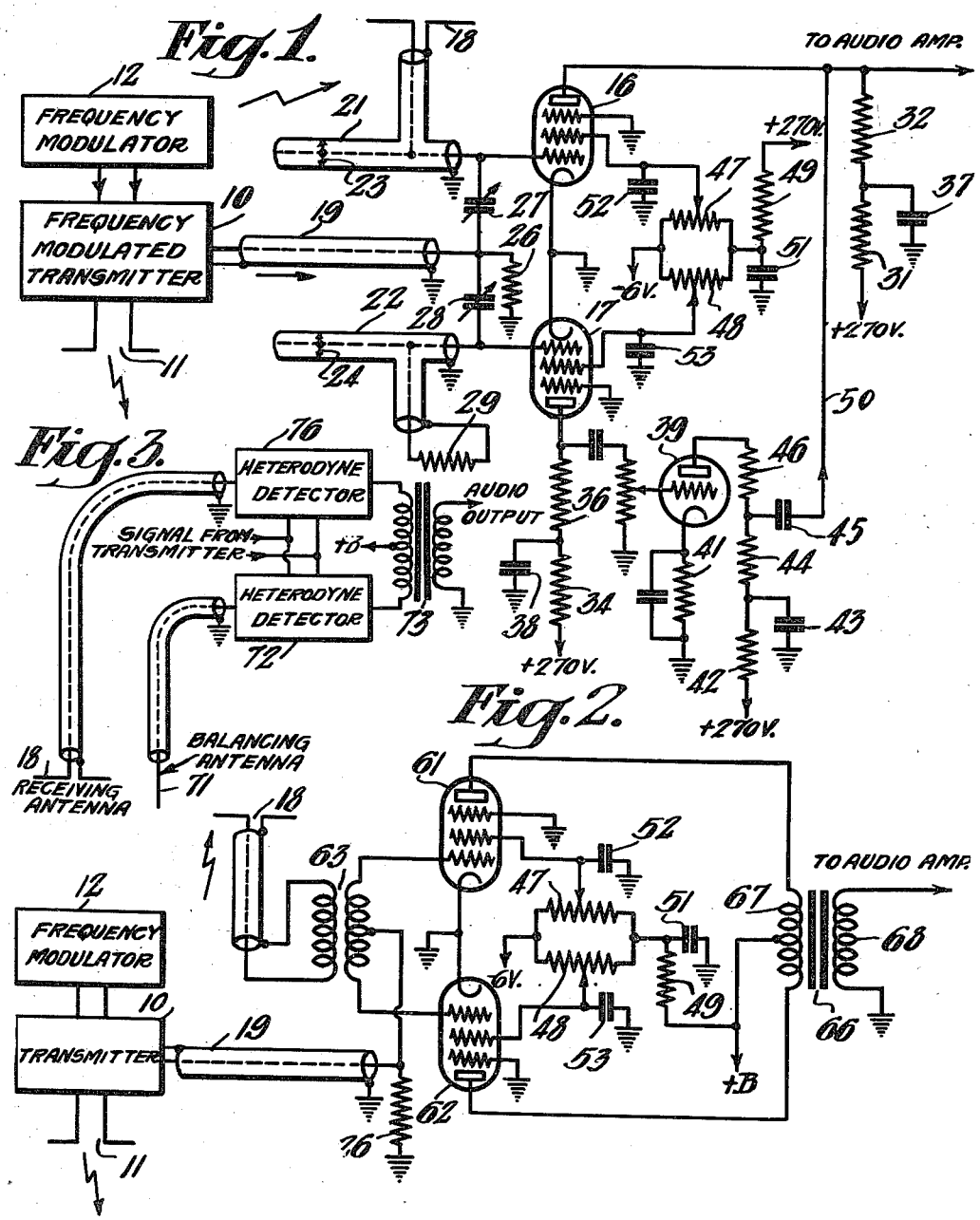

Patented Apr. 15, 1947

2,419,046

UNITED STATES PATENT OFFICE 2,419,046

FREQUENCY MODULATED ALTIMETER OR DISTANCE INDICATOR

Irving Wolff and Royden C. Sanders, Jr., Haddonfield, N. J., assignors to Radio Corporation of America, a corporation of Delaware Application May 29, 1942, Serial No. 445,010

6 Claims. (Cl. 250—1.68)

1

Our invention relates to radio systems such as radio altimeters for indicating distance or height and will be described particularly with respect to systems wherein the radiated wave is frequency modulated.

Systems of this character are described in Bentley Patent 2,011,392 and Espenschied Patent 2,045,071. In these systems, the radiated frequency modulated wave is reflected from the earth's surface or other object and the reflected wave is received in a heterodyne receiver located in the vicinity of the transmitter. The heterodyning or mixing signal for the receiver is obtained directly from the transmitter whereby the receiver output includes a signal of "difference frequency" which frequency is determined by the time required for the radiated signal to reach the reflecting object and return to the receiver.

It has been found that one of the things that limits the full use of the sensitivity of the receiver is the interfering signal resulting from the amplitude modulation normally present on the mixing signal that is applied to the heterodyne detector. When the optimum mixing voltage, i. e., optimum with respect to noise ratio, is introduced on the heterodyne detector, the amplitude modulated signal in the output of the receiver is still ten to fifty times the noise level when the transmitter signal is swept through a twenty megacycle bandwidth.

It might be expected that there would be no amplitude modulation on the mixing signal. This would be true if it were not for the difficulty of transmitting a wide frequency band signal over a line with uniform attenuation at all frequencies. In actual practice there are reflections on the line to the transmitter antenna and on the line between the transmitter and the receiver because of practically unavoidable imperfect line terminations, for example.

While amplitude modulation on the mixing signal causes the greater part of the above mentioned interference, there also may be some interference usually almost negligible, caused by amplitude modulation on the received reflected signal. The latter modulation is introduced because of such factors as imperfect termination of the line from the transmitter to the transmitter antenna and possibly because of frequency selective reflection of the signal.

An object of our invention is to provide improved means for reducing the interfering amplitude modulation signal appearing in the output of a receiver in a system of the above-described type. A further object of the invention is to provide an

2 improved receiver for a system of the above-described type.

In practicing one embodiment of the invention, the receiver is provided with a balanced detector having one detector tube that receives the reflected signal and the heterodyning signal while the other detector tube receives the heterodyning signal only. Thus the amplitude modulation appearing in the second tube balances out the amplitude modulation appearing in the first tube.

In a preferred embodiment of the invention, a balanced detector is employed in which each detector tube has the reflected signal and the heterodyning signal applied thereto with the two signals having a phase relation with respect to each other at one tube that is the opposite of their phase relation with respect to each other at the other tube. The reflected signal may be applied to the tubes in push-pull relation while the heterodyning signal is applied to them in parallel relation, for example. By connecting the output circuits of the tubes in balanced relation, any amplitude modulation of the applied signals, and particularly of the heterodyning signal may be balanced out while the heterodyne or difference frequency signal appears in the detector output circuit. Likewise, any interfering or jamming signal may be balanced out.

The operation of the preferred embodiment of the invention is based upon the fact that if a heterodyning signal of one polarity is mixed with a received signal to produce a beat frequency signal and if this same heterodyning signal, but of opposite polarity, is mixed with the received signal to produce another beat frequency signal, then the two beat frequency signals are of opposite polarity, i. e., 180 degrees out of phase. It is also based upon the fact that the detected amplitude modulation signal, i. e., the amplitude modulation envelope, is of the same polarity at the anodes of the two detector tubes and therefore may be balanced out.

The invention will be better understood from the following description taken in connection with the accompanying drawing in which Figs. 1 and 2 are circuit diagrams of radio altimeters designed in accordance with two embodiments of our invention, and Fig. 3 is a circuit and block diagram of another embodiment of the invention wherein direct antenna pickup from the transmitter is balanced out.

In the several figures like parts are indicated by the same reference characters.

Referring to Fig. 1, the altimeter comprises a frequency modulated radio transmitter 10 having a dipole antenna 11 which radiates a frequency modulated signal toward the earth. Such a signal is produced by sweeping the frequency of the carrier wave of the transmitter 10 through a frequency band periodically, i. e., by frequency modulating the carrier wave. This may be done by means of a suitable frequency modulator 12, which in one simple form may be a motor driven capacitor (not shown) for varying the tuning of the transmitter oscillator as described in the above-mentioned Espenschied patent.

The receiver comprises two vacuum tubes 16 and 17 which are connected in balanced relation. The reflected signal is picked up by a dipole 18 and applied to the input circuit of the tube 16 only. The heterodyning signal is applied directly from the transmitter 10 over a line 19 to the input circuits of both the tube 16 and the tube 17, this signal being the same as that radiated from antenna 11. Since the heterodyning signal applied to the control grid of tube 16 is in phase with the heterodyning signal applied to the control grid of tube 17, and since, as described below, the output circuits of the tubes are connected in phase opposition, the amplitude modulation introduced by this signal is balanced out. The desired beat frequency signal, produced by mixing the direct transmitter or heterodyning signal and the reflected signal in the tube 16, is not balanced out since it is not produced in the tube 17. Thus the beat frequency signal may be supplied to an audio amplifier, as indicated on the drawing, or directly to a suitable frequency indicator.

Considering the circuit of Fig. 1 more in detail, the tubes 16 and 17 have tuned input circuits comprising tuned concentric lines 21 and 22, respectively, having adjustable shorting bars indicated at 23 and 24. The line 19 is terminated in a load resistor 26. Signal from line 19 is applied to the control grids of tubes 16 and 17 through variable capacitors 27 and 28, respectively. The line 22 is terminated in a resistor 29 having the same resistance as that of the dipole 18.

Referring now to the output or anode circuits of the tubes 16 and 17, the anode of tube 16 is supplied with a positive D.-C. voltage through a filter resistor 31 and an anode or output resistor 32. Likewise, voltage is applied to the anode of tube 17 through a filter resistor 34 and an anode resistor 36. Filter capacitors shunting resistors 31 and 34 are shown at 37 and 38, respectively.

The polarity of the output signal from tube 17 is reversed by an amplifier tube 39 which has its input circuit resistance coupled to the tube 17. The grid of tube 39 may be biased by means of a bypassed cathode resistor 41. The anode of tube 39 is supplied with voltage through a filter resistor 42, shunted by a capacitor 43, and through anode resistors 44 and 46.

The output from tube 39 is combined with that from tube 16 by means of a coupling capacitor 45 and a conductor 50 connected between the anode of tube 16 and the junction point of resistors 44 and 46. Thus, by making the gain in amplifier 39 unity, the amplitude modulation appearing in its output circuit balances out the similar amplitude modulation appearing in the output circuit of tube 16.

The screen grids of tubes 16 and 17 are supplied with positive D.-C. potential from potentiometer resistors 47 and 48, respectively, which are connected at one end through a filter resistor 49 to the positive terminal of a voltage source and are connected at the other end to a negative point on said voltage source. Filter capacitors are shown at 51, 52 and 53.

In Fig. 2 any amplitude modulation on the mixing signal supplied from the line 19 or on the reflected signal supplied from dipole 18 is balanced out in a balanced detector circuit comprising vacuum tubes such as pentodes 61 and 62. Likewise, any amplitude modulated signal or unsynchronized frequency modulated signal that may be present, such as a jamming signal transmitted accidentally or deliberately, will be balanced out. The reflected signal picked up by antenna 18 is applied through a transformer 63 to the control grids of tubes 61 and 62 in push-pull relation. The heterodyning signal from line 19 is applied through a center tap on the secondary of transformer 63 to the control grids of tubes 61 and 62 in parallel or "in-phase" relation.

The output circuit of the balanced detector includes a transformer 66 that has a center-tapped primary 67 and a secondary 68. Anode voltage is supplied from a suitable "B" supply (not shown) through the center tap and through opposite halves of the primary 67 to the anodes of tubes 61 and 62. The secondary 68 supplies the output signal to an audio frequency amplifier and suitable frequency counter or indicator (not shown).

In operation, any amplitude modulation that may be present in the mixing signal or in the reflected signal or any jamming signal is balanced out in the primary 67. This is because, as previously noted, any amplitude modulation signal will have the same polarity or phase at the anode of tube 61 as at the anode of tube 62. If for some reason there is some unbalance in the circuit, a more exact balance may be obtained by adjusting one or both of the variable taps on the resistors 47 and 48 to adjust the screen grid voltages.

Since the reflected signal is supplied to the tubes 61 and 62 in push-pull relation while the mixing signal is supplied thereto in parallel relation, the beat or difference frequency signal that is produced by mixing the reflected signal with the heterodyning signal from line 19 will appear at the anodes of tubes 61 and 62 in out-of-phase relation as previously explained. Therefore, the beat frequency signal from tube 61 and the beat frequency signal from tube 62 will add in the primary 67 and will appear across secondary 68. It should be understood that, if preferred, the mixing signal may be applied to the detector in push-pull relation and the reflected signal applied thereto in parallel relation.

Fig. 3 shows an additional feature that may be applied to an altimeter receiver for reducing direct receiver antenna pickup from the nearby transmitter antenna (antenna 11 in Fig. 1). Such pickup may be balanced out by providing a vertical antenna 71, i. e., an antenna positioned at right angles to the receiver antenna 18, and feeding the pickup from antenna 71 into a balancing circuit comprising a heterodyne detector 72 and an output transformer 73. The receiver antenna 18 supplies the reflected signal to a heterodyne detector 76. The detectors 72 and 76 may be like detectors 16 and 17 of Fig. 1 and they may have input circuits similar to those detectors. Antenna 71 will have the same direct pickup from the transmitter antenna (11 in Fig. 1) as the receiver antenna 18 but it will have substantially no pickup of the reflected signal since it is vertical instead of horizontal. Thus the direct pickup signal is balanced out in transformer 73.

It may be noted that the apparatus shown in Fig. 2 may be utilized to advantage to measure the Doppler Effect for the purpose of determining the ground speed of an airplane for example. When the apparatus is so used, the frequency modulator 12 is disconnected from the transmitter so that a constant frequency carrier wave is transmitted. In this case there will be no amplitude modulation on the mixing signal but there may be undesired amplitude modulation on the reflected signal.

We claim as our invention:

1. The method of reducing the amount of undesired amplitude modulation in a beat frequency signal, said method comprising transmitting a carrier wave to a reflecting surface and receiving it after reflection from said surface, mixing said wave before said reflection with said wave after said reflection whereby any difference in the frequencies of said mixed waves appears as a difference or beat frequency signal, the one of said mixed waves that was not reflected having an undesired amplitude modulation, obtaining from said one wave a signal corresponding to said undesired amplitude modulation, and combining the resulting mixed output and said undesired amplitude modulation signal in such phase relation that said difference frequency signal is obtained while a substantial amount of said undesired amplitude modulation is balanced out, and passing said difference frequency signal only to a utilization circuit.

2. A radio system comprising means for transmitting a carrier wave to a reflecting surface, a receiver for receiving said wave after reflection from said surface, a frequency responsive device, said receiver comprising a heterodyne detector, means for applying said reflected wave to said detector, means for also applying said carrier wave directly from said transmitter to said detector whereby any difference in the frequencies of the waves applied to said detector appears as a difference or beat frequency signal which may also contain an amplitude modulation signal, and means for balancing out said amplitude modulation signal while supplying said beat frequency signal to said frequency responsive device.

3. A radio distance determining system comprising means for transmitting a frequency modulated carrier wave to a reflecting surface, a receiver for receiving said wave after reflection from said surface, said receiver comprising a pair of heterodyne detector tubes, means for applying said reflected wave to at least one of said detector tubes, means for also applying said modulated wave directly from said transmitter to said one detector tube whereby a difference or beat frequency is produced and for applying it to the other detector tube, and means for adding the resulting output signals of said two signals of said two detector tubes in such phase relation and with such relative amplitudes that any amplitude modulation signal in said output signals is substantially balanced out.

4. A radio distance determining system comprising means for transmitting a frequency modulated carrier wave to a reflecting surface, a receiver for receiving said wave after reflection from said surface, said receiver comprising a heterodyne detector, means for applying said reflected wave to said detector, means for also applying said modulated wave directly from said transmitter to said detector whereby a difference or beat frequency is produced, a second detector, means for applying said modulated wave directly from said transmitter to said second detector as the only signal applied thereto, and means for adding the resulting output signals of said two detectors in phase opposition and with such relative amplitudes that any amplitude modulation signal in said output signal is substantially balanced out.

5. A radio distance determining system comprising means for transmitting a frequency modulation carrier wave to a reflecting surface, a receiver system including a horizontal antenna for receiving said wave after reflection from said surface, said receiver comprising a heterodyne detector, means for applying said modulated wave directly from said transmitter to said detector whereby a difference or beat frequency signal is produced, a frequency responsive device, means for balancing out any amplitude modulation signal while supplying said beat frequency signal to said frequency device, and additional means including a vertical antenna for balancing out any signal picked up directly from said transmitting means by said horizontal antenna.

6. A radio distance determining system comprising means for transmitting a frequency modulated carrier wave to a reflecting surface, a receiver for receiving said wave after reflection from said surface, a frequency responsive device, said receiver comprising a heterodyne detector, means for applying said reflected wave to said detector, means for also applying said frequency modulated carrier wave directly from said transmitter to said detector whereby a difference or beat frequency signal is produced, and means for balancing out at least a substantial amount of undesired amplitude modulation signals while supplying said beat frequency signal to said frequency responsive device.

IRVING WOLFF.
ROYDEN C. SANDERS, Jr.

REFERENCES CITED

The following references are of record in the file of this patent:

UNITED STATES PATENTS

| Number | Name | Date |
|---|---|---|
| 1,918,433 | Smythe | July 18, 1933 |
| 2,268,587 | Guanella | Jan. 6, 1942 |